United States Patent
Dasilva et al.

(10) Patent No.: US 7,959,109 B2
(45) Date of Patent: Jun. 14, 2011

(54) DUAL VALVE APPARATUS FOR AIRCRAFT ENGINE ICE PROTECTION AND RELATED METHODS

(75) Inventors: Olubusola Anthony Dasilva, Bothell, WA (US); Heath Alan Conn, Bothell, WA (US); Erik Marc Langhofer, Seattle, WA (US); Hosam El Din El-Gabalawy, Bothell, WA (US); Joseph M. DiRusso, Seattle, WA (US)

(73) Assignee: The Boeing Company, Chicago, IL (US)

( * ) Notice: Subject to any disclaimer, the term of this patent is extended or adjusted under 35 U.S.C. 154(b) by 519 days.

(21) Appl. No.: 12/167,164

(22) Filed: Jul. 2, 2008

(65) Prior Publication Data

US 2010/0001138 A1 Jan. 7, 2010

(51) Int. Cl.
*B64D 15/04* (2006.01)
(52) U.S. Cl. .................. 244/134 R; 60/39.093
(58) Field of Classification Search ........... 244/53 B, 244/134 R, 134 B; 60/39.093
See application file for complete search history.

(56) References Cited

U.S. PATENT DOCUMENTS

| | | | |
|---|---|---|---|
| 2,217,299 A | 10/1940 | Taylor | |
| 2,515,519 A | 7/1950 | Lawrence et al. | |
| 2,663,993 A * | 12/1953 | Mosser | 60/223 |
| 2,883,129 A | 4/1959 | MacIntyre | |
| 3,720,388 A | 3/1973 | Kaatz et al. | |
| 4,482,114 A | 11/1984 | Gupta et al. | |
| 4,775,117 A * | 10/1988 | Standke | 244/134 F |
| 4,802,621 A | 2/1989 | Standke | |
| 4,831,819 A * | 5/1989 | Norris et al. | 60/39.093 |
| 5,063,963 A | 11/1991 | Smith | |
| 5,161,364 A | 11/1992 | Bruun et al. | |
| 5,540,252 A | 7/1996 | Bruun | |
| 5,890,677 A | 4/1999 | Guillot et al. | |
| 6,442,944 B1 * | 9/2002 | Skur, III | 60/782 |

FOREIGN PATENT DOCUMENTS

| | | |
|---|---|---|
| EP | 0234418 A2 | 9/1987 |
| FR | 2120049 | 8/1972 |
| GB | 0584804 | 1/1947 |
| GB | 0605990 | 8/1948 |
| GB | 2355243 A | 4/2001 |
| JP | 2009096324 A | 5/2009 |

* cited by examiner

*Primary Examiner* — Rob Swiatek
(74) *Attorney, Agent, or Firm* — Harness, Dickey & Pierce, P.L.C.

(57) ABSTRACT

A thermal anti-ice system in an aircraft. A controlled valve receives air from a compressor bleed port of an engine of the aircraft. A self-regulating valve is fluidly connected between the controlled valve and an inlet of the engine. A first pressure sensor senses pressure between the valves. A second pressure sensor senses pressure between the self-regulating valve and the inlet. The system can be used to de-ice aircraft inlet lip skins made of composite materials that have comparatively lower design temperatures than other comparable materials.

28 Claims, 6 Drawing Sheets

DUAL VALVE APPARATUS FOR AIRCRAFT ENGINE ICE PROTECTION AND RELATED METHODS

FIELD

The present disclosure relates generally to aircraft anti-ice systems and more particularly (but not exclusively) to thermal anti-ice systems for aircraft engines.

BACKGROUND

The statements in this section merely provide background information related to the present disclosure and may not constitute prior art.

In aircraft engine anti-ice (EAI) systems, engine compressor bleed air is commonly used to provide thermal anti-icing to engine inlet cowls. Varying engine power levels during different phases of flight affect compressor bleed air pressure and temperature, which in turn can affect heat provided by an EAI system to an engine inlet. Effects of such conditions can vary dependent on types of materials from which an aircraft nacelle is fabricated. For example, temperatures at which composite materials may be affected by heat typically are lower than temperatures at which metal aircraft skin material may be affected.

SUMMARY

The present disclosure, in one implementation, is directed to a thermal anti-ice system in an aircraft. A controlled valve is configured to receive air from a compressor bleed port of an engine of the aircraft. A self-regulating valve is fluidly connected between the controlled valve and an inlet of the engine. A first pressure sensor is configured to sense pressure between the valves. A second pressure sensor is configured to sense pressure between the self-regulating valve and the inlet.

In another implementation, the disclosure is directed to a thermal anti-ice system in an aircraft. A controlled valve is configured to receive air from a compressor bleed port of an engine of the aircraft. A self-regulating valve is in series with the controlled valve. Air travels from the controlled valve through the self-regulating valve to an inlet of the engine. A first pressure sensor is configured to sense pressure between the valves. A second pressure sensor is configured to sense pressure between the self-regulating valve and the inlet. The pressure sensors are configured to provide values for evaluating performance of the valves.

In yet another implementation, the disclosure is directed to a controller-performed method of providing thermal anti-icing in an aircraft. The method includes controlling a valve that receives air from a compressor bleed port of an engine of the aircraft and is fluidly connected with an inlet of the engine through a self-regulating valve. The method also includes receiving a first input representing pressure in a fluid connection between the controlled valve and the self-regulating valve, and receiving a second input representing pressure in a fluid connection between the self-regulating valve and the inlet. The controlling is performed based on the first and second inputs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
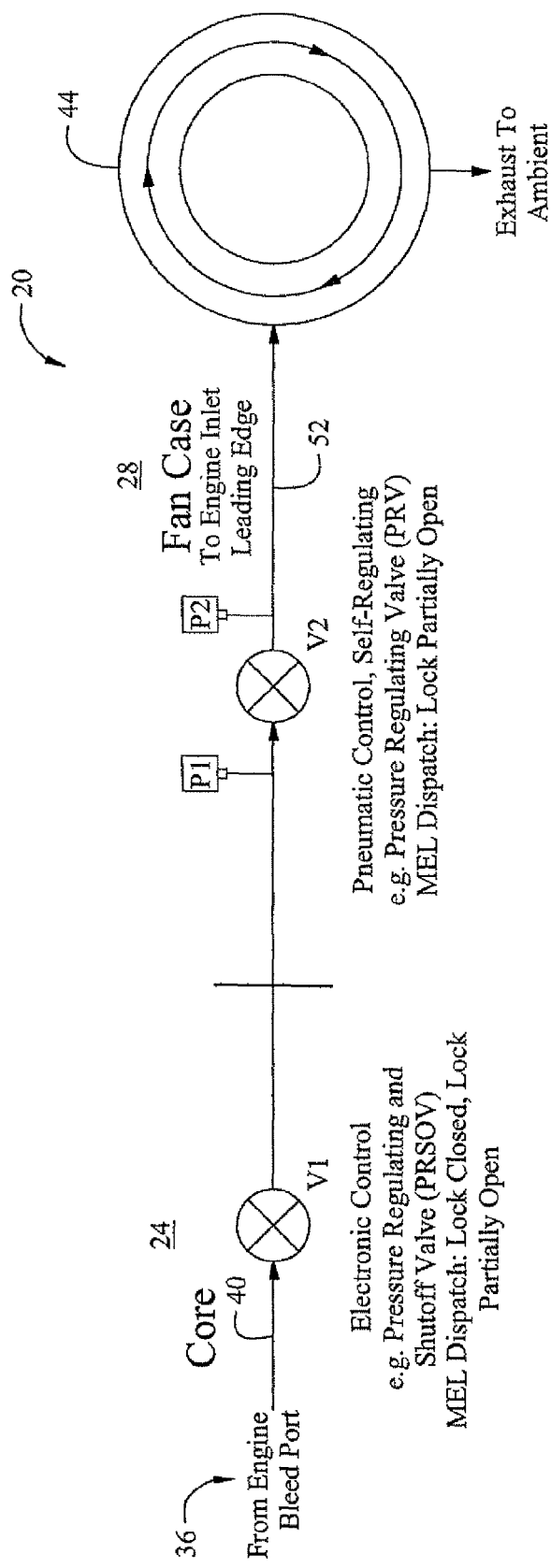
FIG. 1 is a diagram of an aircraft thermal anti-ice system in accordance with one implementation of the disclosure.

The following description is merely exemplary in nature and is not intended to limit the present disclosure, application, or uses. It should be understood that throughout the drawings, corresponding reference numerals indicate like or corresponding parts and features. Although various implementations of the disclosure are described with reference to aircraft in which composite materials are used, the disclosure is not so limited. The disclosure could be implemented in relation to aircraft and aircraft components fabricated of metal and/or other materials commonly used in the manufacture of aircraft.

The present disclosure, in various implementations, is directed to a thermal anti-ice system in an aircraft. For operation at low engine power, the anti-ice system delivers high mass flow rates in order to provide heat flux for ice protection. At high engine power levels, heat flux is regulated to maintain engine inlet temperatures within material limits. Such conditions can be maintained in the event of a single failure or probable combination of failures.

In various implementations of the disclosure, in order to provide sufficient heat flux for anti-icing under normal operating conditions, engine power levels are automatically adjusted as a function of altitude, outside air temperature, icing severity and air speed. In such manner, an engine anti-ice system in accordance with one configuration can provide heat flux sufficient for anti-icing. Size and weight of EAI system components, and fuel burn impacts when low engine power levels are desired, can be minimized.

Full system capability for Minimum Equipment List (MEL) aircraft dispatch is a highly desirable feature. Embodiments of the present system can provide such capability by allowing each of two valves to be locked in a closed and/or partially open position for MEL dispatch. For a valve locked in a partially open position, a minimum engine power level is automatically or manually set to maintain adequate heat flux to the inlet of the engine.

A thermal anti-ice system in accordance with one implementation of the disclosure is indicated generally in FIG. 1 by reference number 20. The system 20 is used in an aircraft engine having a core compartment 24 and a fan compartment 28. A valve V1 receives air from a compressor bleed port 36 of the engine via a fluid connection 40. The valve V1 is an electronically controlled valve, e.g., a pressure regulating and shut-off valve (PRSOV). A self-regulating valve V2 is in series with the controlled valve V1 and is fluidly connected between the controlled valve V1 and an inlet 44 of the engine. The valve V2 is a shut-off or pneumatically controlled valve, e.g., a pressure regulating valve (PRV).

Other or additional types of valves could be used in various implementations. Further, various components of an anti-ice system could be distributed in various ways. For example, in one configuration both valves V1 and V2 may be located in the fan compartment 28. In another configuration, both valves V1 and V2 may be located in the engine core region 24.

Two pressure sensors P1 and P2 are situated respectively upstream and downstream of the self-regulating valve V2. The pressure sensor P1 senses pressure in a fluid connection 48 between the self-regulating valve V2 and the controlled valve V1. The pressure sensor P2 senses pressure in a fluid connection 52 between the self-regulating valve V2 and the inlet 44. In various implementations, the valve V1 is controlled based on pressures sensed by the sensors P1 and P2 as further described below.

Figure 2:
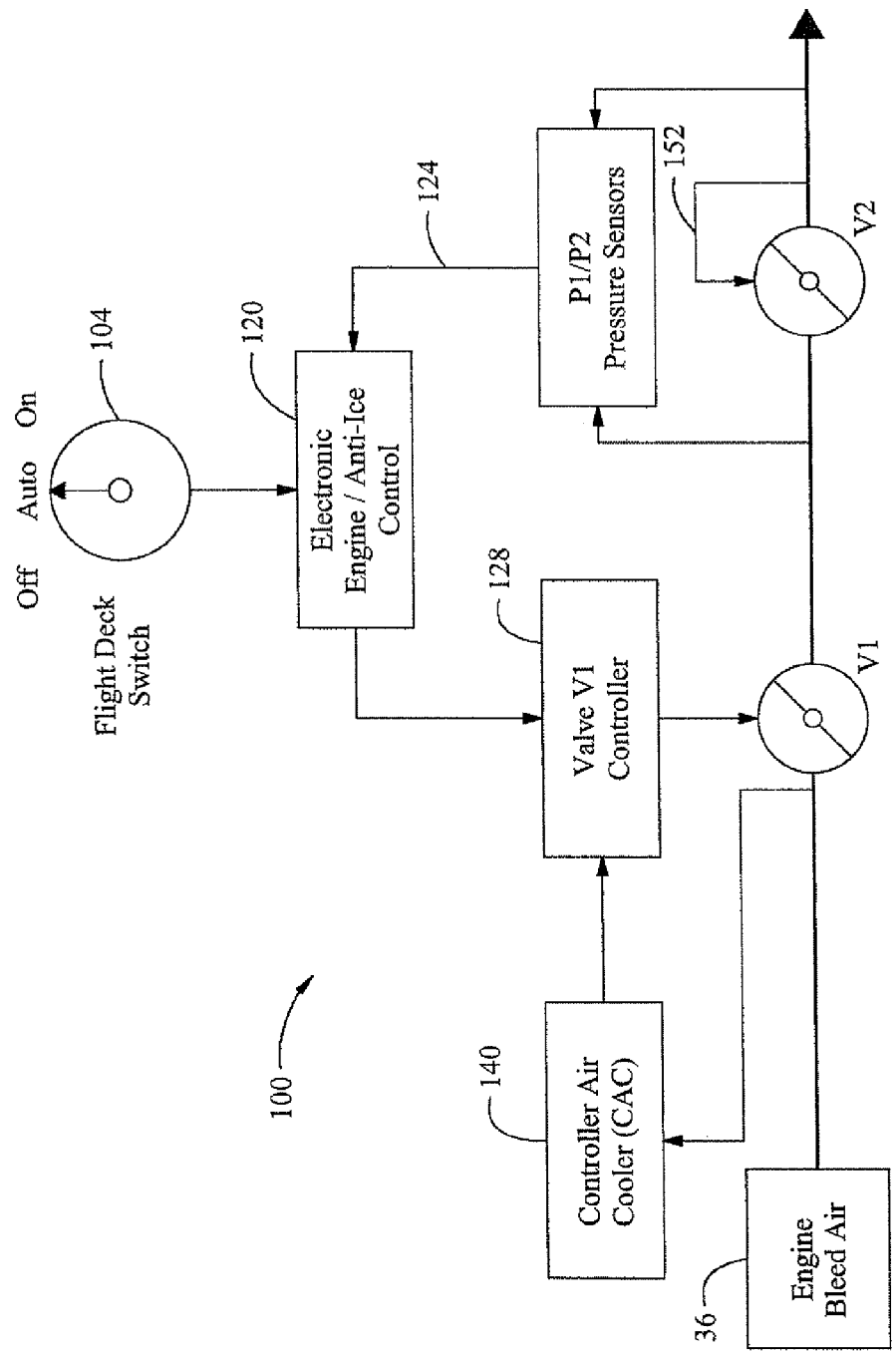
FIG. 2 is a diagram of an engine anti-ice control system in accordance with one implementation of the disclosure.

An engine anti-ice control system architecture in accordance with one implementation of the disclosure is indicated generally in FIG. 2 by reference number 100. The anti-ice system 20 may be controlled automatically and/or manually via a flight deck switch 104. The flight deck control 104 is in communication with a control module 120. The control module 120 is or includes a software-programmable computer that receives signals from the pressure sensors P1 and/or P2 via wired connection 124 and sends signals to an electronic valve controller 128. Although the wired connection 124 is shown as a single connection, it should be noted that the control module 120 receives a signal from each of the pressure sensors P1 and P2. Additionally or alternatively, the control module 120 may receive combined and/or comparative signals from the pressure sensors P1 and P2. There are numerous ways in which pressure sensor information may be processed and sent to the control module 120.

In various configurations, other or additional computers, processors, etc. may be used in place of or in addition to the control module 120. For example, the control module 120 may be, include, or be included in an integrated computing system of the aircraft known as the "common core system" (CCS), an electronic anti-ice control, and/or a main engine data concentrator (MEDC). Many different configurations of processors and memory could be used to provide the functionality of the control module 120. An optional controller air cooler (CAC) 140 cools engine bleed air and provides the cooled air to the valve controller 128. In various configurations, temperatures handled by the valve controller 128 may be such that no CAC is needed.

The valve V1 is configured to provide for dynamic control of pressure downstream of the valve V1 to a set point that may be controlled via software and electronic control, e.g., by the control module 120 and electronic valve controller 128. Thus the valve V1 can be controlled to regulate to a pressure that varies as a function of a selectable aircraft parameter, e.g., engine power, day temperature, altitude, etc. Feedback from the pressure sensors P1 and P2 can be used to calculate heat delivered to the inlet of the engine and to perform system diagnostics.

The valve V2 is a mechanical valve that regulates to a pre-designated regulation pressure. The valve V2 is configured to regulate to pressure downstream of the valve V2. The valve V2 receives this pressure via a fluid connection 152 between the valve V2 and the engine inlet. This set point can be designed to prevent excessive heating of the engine inlet lip skin and surrounding material.

To accommodate system failures, the valve V1 can also be manually set or pinned prior to a flight to a position designated for Minimum Equipment List (MEL) aircraft dispatch. Locking the valve V1 in a partially open position allows the maximum inlet temperature to stay within material limitations for high power settings. With the valve V1 locked in a partially open position, a minimum engine power level is maintained when in icing conditions so as to maintain adequate anti-icing heat. The valve V1 can be locked in the closed position for MEL dispatch into non-icing conditions.

The valve V2 can also be manually set or pinned prior to a flight to a position designated for Minimum Equipment List (MEL) aircraft dispatch. Locking the valve V2 in a partially open position allows the maximum inlet temperature to stay within material limitations for high power settings. With the valve V2 locked in a partially open position, a minimum engine power level is maintained when in icing conditions so as to maintain adequate anti-icing heat.

Figure 3:
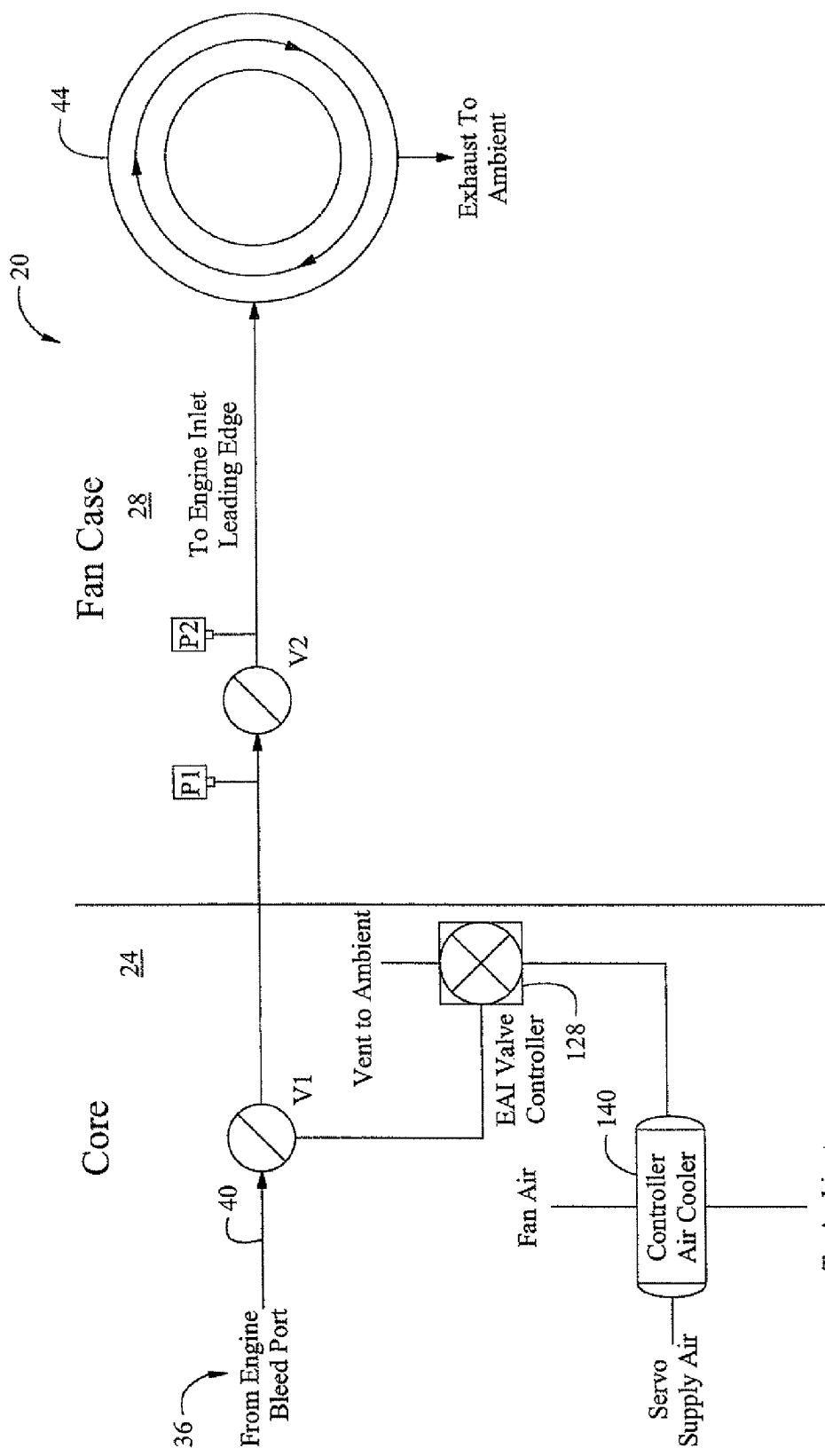
FIG. 3 is a diagram of an aircraft thermal anti-ice system in accordance with one implementation of the disclosure.

Another exemplary configuration of an engine anti-ice system is indicated generally in FIG. 3 by reference number 200. In the system 200, a CAC 140 and valve controller 128 are located in an engine core compartment 24. The valve controller 128 is fluidly connected with valve V1. The valve V2 is configured to receive downstream pressure via a fluid connection (as shown in FIG. 2) between the valve V2 and the inlet 44 of the engine.

The pressure sensors P1 and P2 may be used in regulating the valve V1, conducting built-in testing (BIT), and/or generating Engine Indication and Crew Alerting System (EICAS) messages. In one implementation and referring to FIGS. 1 and 2, under appropriate flight conditions the system 20 may be "BIT" tested in the following manner. The control module 120 commands the valve controller 128 to open the valve V1 to cause the valve V2 to regulate. Testing includes obtaining pressure signals from sensors P1 and P2 to determine whether the valve V2 is operating normally. Similar testing may be performed to test whether the valve V1 and/or pressure sensors P1 and/or P2 are operating normally. In some configurations, one of the pressure sensors P1 or P2 may be subject to built-in testing (BIT) using the other pressure sensor and at least one aircraft parameter. It should be noted generally that unless otherwise indicated, the terms "aircraft parameter", "aircraft parameters" and the like may be used in this disclosure and the claims to refer to one or more parameters, including but not limited to engine power, day temperature, altitude, EAI system parameters, engine compressor pressure, etc.

Figure 4:
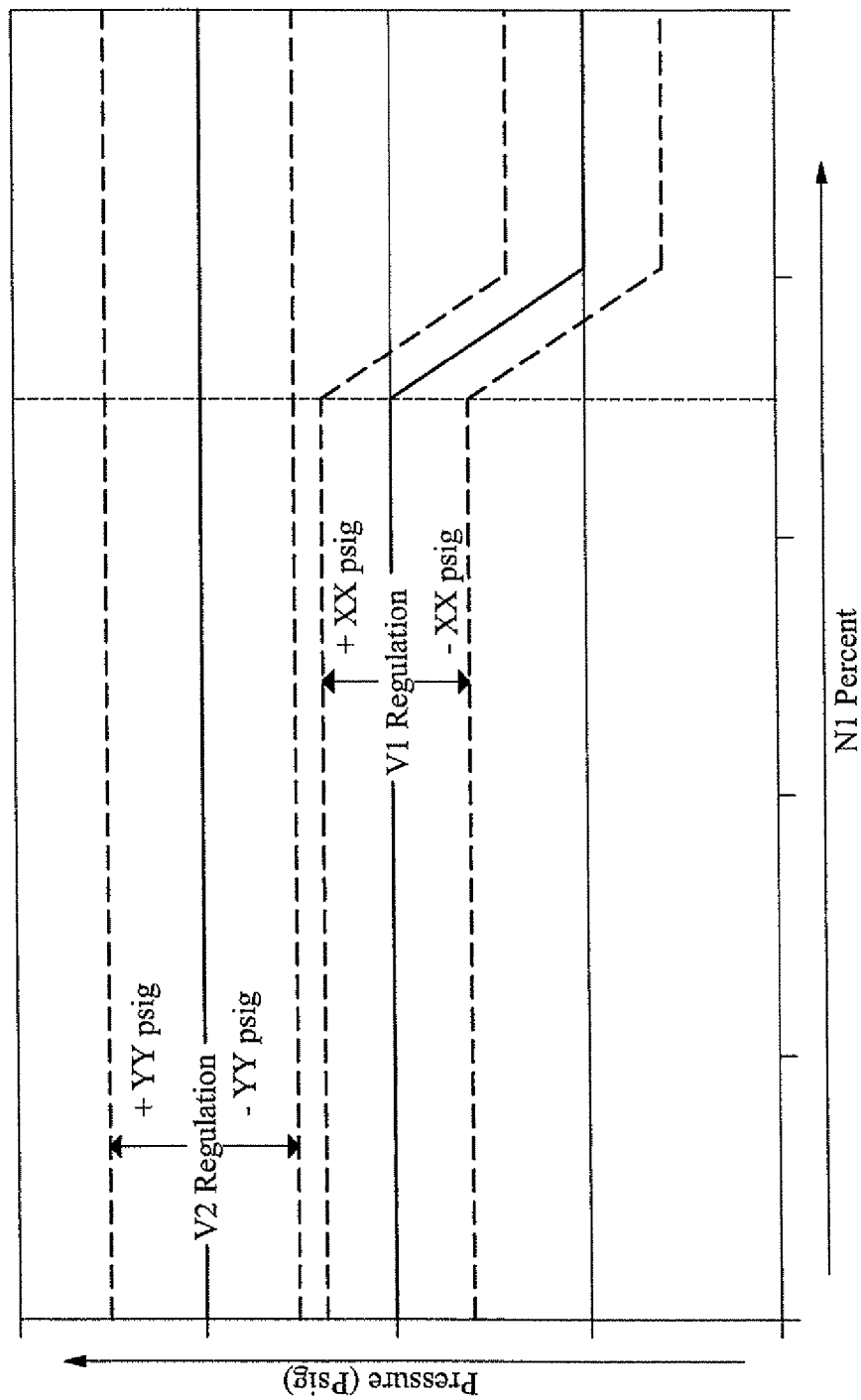
FIG. 4 is a graph of pressures to which valves regulate relative to engine speed in accordance with one implementation of the disclosure.

Various pressure regulating methods based on engine speed are possible. The regulation methods described herein substantially eliminate disruptive regulatory interaction while minimizing interfaces required for system control. For example, as shown in FIG. 4, the valve V1 can be controlled to regulate to a pressure that is a function of engine power level, but always lower than the regulation set point of valve V2. The regulation set point of valve V2 is set higher than that of valve V1, thus allowing valve V2 to remain in the fully open position. If valve V1 fails, or is locked for MEL dispatch, then valve V2 regulates to a pressure downstream between valve V2 and the inlet of the engine.

Figure 5:
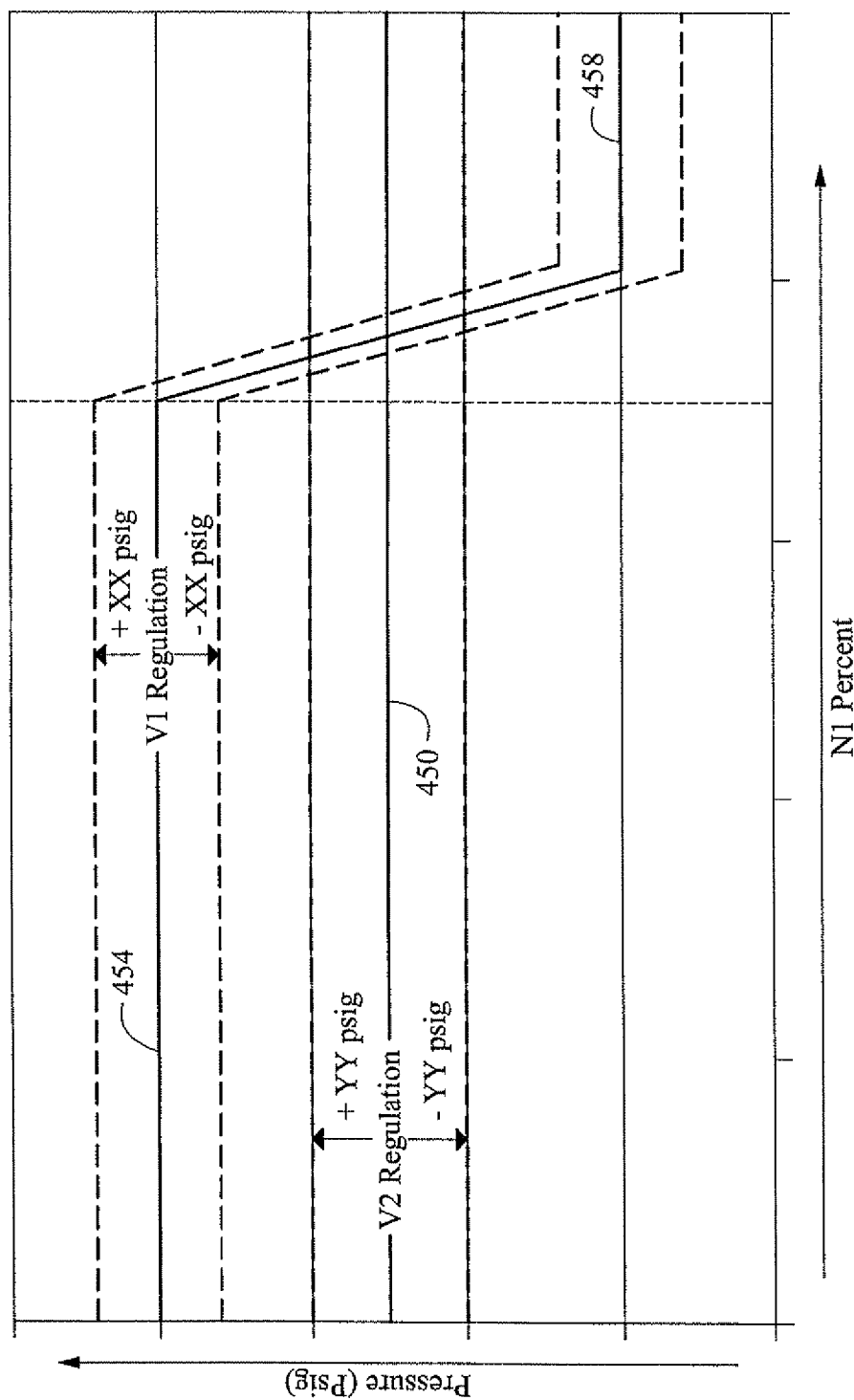
FIG. 5 is a graph of pressures to which valves regulate relative to engine speed in accordance with one implementation of the disclosure.

In another implementation and as shown in FIG. 5, the valve V2 self-regulates during low engine speeds to a pressure 450 lower than a pressure 454 to which the valve V1 is regulated. During high engine speeds, the valve V1 is regulated to a pressure 458, which is lower than the pressure 450 to which the valve V2 self-regulates. In the present example, engine speed becomes "high" when it reaches about 70 percent of N1. This value is only exemplary, however. Values for "high" and "low" engine speeds will vary dependent on various factors.

Figure 6:
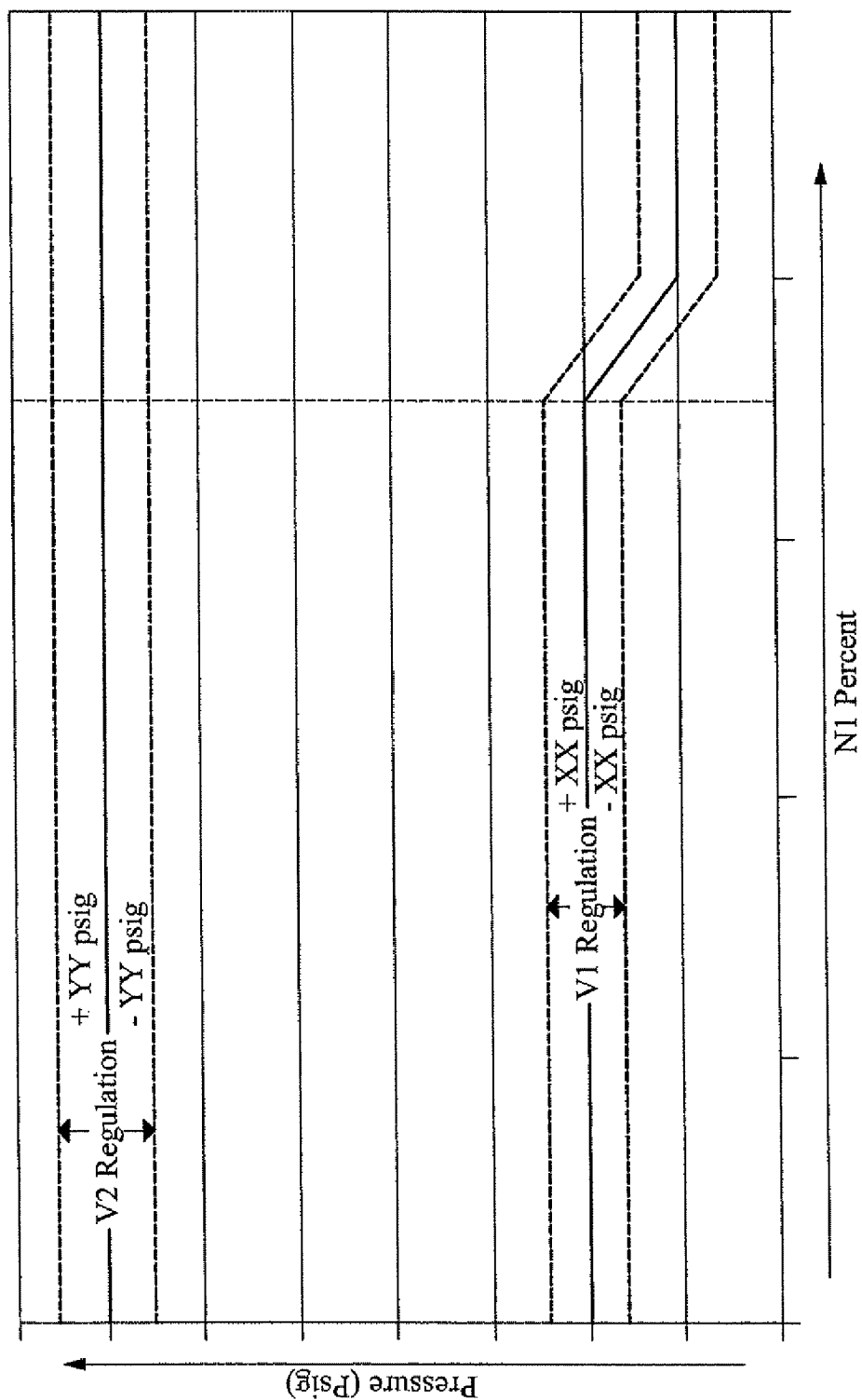
FIG. 6 is a graph of pressures to which valves regulate relative to engine speed in accordance with one implementation of the disclosure.

Another regulation method is shown in FIG. 6. The valve V1 can be controlled to regulate to a pressure that is a function of engine power level, but always lower than the regulation set point of valve V2. The regulation set point of valve V2 is set higher than that of valve V1, thus allowing valve V2 to remain in the fully open position provided valve V1 is working properly. Valve V2 is a shut off valve that goes to a partially open position when upstream pressure exceeds the regulation set point of valve V2. Additionally or alternatively, the valve V2 could be implemented as an electronic regulating valve with a pressure regulation that varies as a function of aircraft parameter(s).

During aircraft descent, engine compressors may not generate sufficient pressure to support engine anti-icing. Accordingly, aircraft manufacturers commonly provide for application of additional thrust during aircraft descent to allow anti-icing to continue to take place. In various implementations of the present disclosure, additional thrust may (or may not) be provided based on one or more aircraft parameters. For example, the control module 120 may use a lookup table to command a minimum engine power level to maintain adequate pressure to the anti-ice system 20 based, e.g., on engine speed, total and/or static outside air temperature, liquid water content, airspeed and altitude. In such manner, fuel usage can be reduced during aircraft descent.

The use of two pressure sensors provides for detection of downstream pressure while preventing latent failures that might not otherwise be detected. The sensor P2 provides positive indication of pressure levels output to the engine inlet 44 as regulated from the valve V1 via software during normal operation. The control module 120 is configured to determine a comparative value between the two sensors, making it possible to distinguish between a failure of the valve V1 and a failure of the valve V2. These features are in contrast to existing dual butterfly systems that require extensive hardware to provide dynamic regulation and also require extensive software to prevent unintended interaction between the valves.

Various implementations of the foregoing system can provide adequate heat to prevent icing at an engine inlet while preventing overheating conditions at the inlet. The system thus can be used to anti-ice aircraft inlets made of composite materials that have comparatively lower design temperatures than other materials. Wiring, EAI system ducting, supporting LRUs and thickness of heat transfer materials can be reduced, thereby reducing weight and costs. Software controls for EAI systems can be simplified.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A thermal anti-ice system in an aircraft comprising:
    a controlled valve configured to receive air from a compressor bleed port of an engine of the aircraft;
    a self-regulating valve fluidly connected between the controlled valve and an inlet of the engine;
    a first pressure sensor configured to sense pressure between the valves; and
    a second pressure sensor configured to sense pressure between the self-regulating valve and the inlet.

2. The system of claim 1, wherein the controlled valve is controlled based on the sensed pressures.

3. The system of claim 1, wherein the controlled valve comprises a pressure-regulating shut-off valve (PRSOV).

4. The system of claim 1, wherein the self-regulating valve comprises a pressure-regulating valve (PRV).

5. The system of claim 1, wherein the controlled valve is controlled by a control module via a valve controller.

6. The system of claim 1, wherein the controlled valve is regulated to a pressure value that varies as a function of one or more selectable parameters.

7. The system of claim 1, wherein the self-regulating valve regulates to a predetermined downstream pressure.

8. The system of claim 1, wherein the self-regulating valve comprises a shut-off valve (SOV).

9. The system of claim 8, wherein the shut-off valve regulates to an upstream pressure.

10. A thermal anti-ice system in an aircraft comprising:
    a controlled valve configured to receive air from a compressor bleed port of an engine of the aircraft;
    a self-regulating valve in series with the controlled valve and through which air travels from the controlled valve to an inlet of the engine;
    a first pressure sensor configured to sense pressure between the valves; and
    a second pressure sensor configured to sense pressure between the self-regulating valve and the inlet;
    the pressure sensors configured to provide values for evaluating performance of the valves.

11. The system of claim 10, further comprising a valve controller for controlling the controlled valve, the valve controller configured to provide control to the controlled valve based on values provided by the pressure sensors.

12. The system of claim 10, wherein the controlled valve comprises a pressure-regulating shut-off valve (PRSOV).

13. The system of claim 10, wherein the self-regulating valve comprises a pressure-regulating valve (PRV).

14. The system of claim 10, wherein the self-regulating valve self-regulates to an upstream pressure.

15. The system of claim 10, wherein the self-regulating valve comprises a shut-off valve (SOV).

16. The system of claim 15, wherein the shut-off valve regulates to an upstream pressure.

17. The system of claim 10, wherein one of the valves is subject to built-in testing (BIT) using at least one of the pressure sensors.

18. The system of claim 10, wherein one of the pressure sensors is subject to built-in testing (BIT) using at least one of the valves.

19. The system of claim 10, wherein, in the event that one of the pressure sensors is non-operational, thermal anti-icing is performed without using the non-operational sensor.

20. The system of claim 10, wherein one of the pressure sensors is subject to built-in testing (BIT) using the other pressure sensor and at least one aircraft parameter.

21. A control-module-performed method of providing thermal anti-icing in an aircraft, the method comprising:
    controlling a valve that receives air from a compressor bleed port of an engine of the aircraft and is fluidly connected with an inlet of the engine through a self-regulating valve;
    receiving a first input representing pressure in a fluid connection between the controlled valve and the self-regulating valve;
    receiving a second input representing pressure in a fluid connection between the self-regulating valve and the inlet;
    the controlling performed based on the first and second inputs.

22. The method of claim 21, further comprising positioning at least one of the valves in a predefined position.

23. The method of claim 22, performed when anti-ice is selected on and when engine idle speed is raised, the method further comprising raising the idle speed as a function of one or more aircraft parameters.

24. The method of claim 21, further comprising performing the controlling based on one or more aircraft parameters.

25. The method of claim 24, performed when anti-ice is selected on and when engine idle speed is raised, the method further comprising raising the idle speed as a function of the one or more aircraft parameters.

26. The method of claim 21, further comprising regulating the controlled valve to a pressure lower than a pressure to which the self-regulating valve regulates, the regulating of the controlled valve performed based on a speed of the engine.

27. The method of claim 26, performed during high-speed operation of the engine, the method further comprising, during low-speed operation of the engine, regulating the controlled valve to a pressure higher than a pressure to which the self-regulating valve regulates.

28. The method of claim 21, further comprising regulating the controlled valve to a pressure lower than a pressure to which the self-regulating valve regulates, and wherein the self-regulating valve regulates to upstream pressure.

* * * * *